United States Patent
Sikkenga et al.

(10) Patent No.: US 8,852,307 B2
(45) Date of Patent: Oct. 7, 2014

(54) FILTER UNIT, FILTRATION METHOD AND SYSTEM

(75) Inventors: Daniel W. Sikkenga, Adrian, MI (US); Christopher L. Schultz, Onsted, MI (US); Thomas A. Parott, Blissfield, MI (US); Richard L. Ricker, Blissfield, MI (US); Antonio R. Galvan, Adrian, MI (US); Brian A. Ford, Blissfield, MI (US); Frederick D. Morrison, Sylvania, OH (US); Patrick D. Farver, Adrian, MI (US); Bruce A. Eppink, Sylvania, OH (US)

(73) Assignee: Blissfield Manufacturing Company, Blissfield, MI (US)

( * ) Notice: Subject to any disclaimer, the term of this patent is extended or adjusted under 35 U.S.C. 154(b) by 367 days.

(21) Appl. No.: 13/230,114

(22) Filed: Sep. 12, 2011

(65) Prior Publication Data
US 2012/0060820 A1    Mar. 15, 2012

Related U.S. Application Data (63) Continuation-in-part of application No. 12/880,051, filed on Sep. 10, 2010, which is a continuation-in-part of application No. 12/807,653, filed on Sep. 10, 2010, now Pat. No. 8,728,189.

(51) Int. Cl.
*B01D 45/00*    (2006.01)
*B01D 45/16*    (2006.01)
*B01D 45/08*    (2006.01)
*F24C 15/20*    (2006.01)

(52) U.S. Cl.
CPC ............ *F24C 15/2035* (2013.01); *B01D 45/16* (2013.01); *B01D 45/08* (2013.01); *Y10S 55/36* (2013.01)
USPC ........................ 55/434.2; 55/444; 55/DIG. 36

(58) Field of Classification Search
USPC ........... 55/434.2, 440, 444, DIG. 36; 165/158
See application file for complete search history.

(56) References Cited

U.S. PATENT DOCUMENTS

| | | | |
|---|---|---|---|
| 3,260,189 | A | 7/1966 | Jensen |
| 3,698,378 | A | 10/1972 | Rosenberg et al. |
| 3,827,343 | A | 8/1974 | Darm |

(Continued)

FOREIGN PATENT DOCUMENTS

| | | |
|---|---|---|
| BE | 899292 | 7/1984 |
| EP | 0021809 | 1/1981 |

(Continued)

*Primary Examiner* — Robert A Hopkins
(74) *Attorney, Agent, or Firm* — Hartman Global IP Law; Gary M. Hartman; Michael D. Winter (57) ABSTRACT

A filter unit, system and method for removing grease, oil and other particulates from air, for example, in a kitchen environment. The filter unit includes a housing having an upstream side, an downstream side, and a cavity therebetween, a heat exchanger disposed within the cavity and comprising at least two tubes, at least one entrance aperture disposed on the upstream side of the housing and defined by at least one fin, at least one baffle disposed on the downstream side of the housing so as to be oppositely disposed from the at least one entrance aperture, and at least one exit aperture disposed on the downstream side of the housing adjacent the at least one baffle. The baffle and fin define at least one flow path through the housing and around the tubes.

15 Claims, 7 Drawing Sheets

(56) References Cited

U.S. PATENT DOCUMENTS

| | | | | |
|---|---|---|---|---|
| 3,945,812 | A | * 3/1976 | Doane | 95/272 |
| 4,050,368 | A | 9/1977 | Eakes | |
| 4,084,745 | A | 4/1978 | Jones | |
| 4,122,834 | A | 10/1978 | Jacobs | |
| 4,175,614 | A | 11/1979 | Huggins | |
| 4,197,907 | A | * 4/1980 | Smith | 165/76 |
| 4,235,220 | A | 11/1980 | Hepner | |
| 4,350,504 | A | 9/1982 | Diachuk | |
| 4,437,867 | A | 3/1984 | Lerner | |
| 4,769,149 | A | 9/1988 | Nobilet et al. | |
| 5,456,244 | A | 10/1995 | Prasser | |
| 5,524,607 | A | 6/1996 | Grohman et al. | |
| 5,540,744 | A | 7/1996 | Renna | |
| 5,558,080 | A | 9/1996 | Grohman et al. | |
| 5,687,707 | A | 11/1997 | Prasser | |
| 6,344,074 | B1 | 2/2002 | Ward et al. | |

FOREIGN PATENT DOCUMENTS

| | | |
|---|---|---|
| EP | 0036659 | 9/1981 |
| FR | 2443033 | 6/1980 |
| FR | 2482703 | 11/1981 |
| RU | 522377 | 9/1976 |

* cited by examiner

FILTER UNIT, FILTRATION METHOD AND SYSTEM

CROSS REFERENCE TO RELATED APPLICATIONS

This is a continuation-in-part patent application of co-pending U.S. patent application Ser. No. 12/880,051, field Sep. 10, 2010, which is a continuation-in-part patent application of co-pending U.S. patent application Ser. No. 12/807,653, filed Sep. 10, 2010, which issued as U.S. Pat. No. 8,728,189. The entire contents of these applications are incorporated herein by reference.

BACKGROUND OF THE INVENTION

The present invention generally relates to filters of the type used in cooking environments to remove grease, oil and other particulates from the air. More particular, the invention relates to a filter unit and method for filtering grease, oil and particulates from hot fumes and transferring heat from the hot fumes to a fluid circulating within the unit. The heated fluid may then be used to supply heat for purposes such as heating water or air.

During the operation of commercial or institutional kitchens, a significant amount of valuable heat energy is lost as a result of hot fumes and/or air being vented to the atmosphere. These hot fumes are generated from cook stoves, hot plates, deep fat fryers, and other cooking apparatus. As a result of such extreme heat and variety of particulates generated during cooking, it is necessary for the comfort and health of kitchen workers to exhaust these fumes, usually on a continuous basis, through flue chimneys or similar venting devices. This process effectively replaces the hot kitchen air with cooler, clean outside air. Although this circulation process is necessary to provide a constant source of clean air to the kitchen environment, this venting practice is both inefficient and uneconomical, especially in colder climates where the cost to heat internal air and water is significant.

A further problem encountered in commercial kitchens is the filtering of grease, oil and other particulates entrained in the hot fumes generated during the cooking of foods. If improperly filtered, entrained grease, oil and particulates can cause fouling and the eventual malfunction of air ventilation systems, as well as create fire hazards if allowed to accumulate. Accordingly, hot fume air filters, which are normally located in fume hoods over cooking surfaces, are generally required to be cleaned daily or at a minimum several times a week. This tedious cleaning process is both time consuming and expensive.

The use of heat exchangers to capture thermal energy above cooking surfaces has been known for years. These designs, however, position the heat exchangers substantially downstream of existing filtration units intended to filter grease, oil and other particulates. This approach is unfavorable for a number of reasons. First, these designs are inefficient since the heat exchanger is located downstream of the filtration unit and a significant distance from the heat source. Thus, valuable thermal energy is lost by absorption into the filtration unit and through general dissipation prior to the heat reaching the exchanger. Second, conventional grease filtration units can significantly impede airflow, especially when congested with grease and oil, hence reducing the efficiency of the air ventilation system and the efficiency of a heat exchanger downstream of the filtration unit. Third, when the heat source is turned off, grease quickly solidifies on filters and heat exchange, and must be removed for both safety and efficiency. Finally, despite the existence of these types of heat exchangers generally, many existing kitchens fail to incorporate any kind of heat exchanger due to integration costs. Retrofitting existing kitchen equipment with heat exchanger systems may require an entirely new flue hood assembly and substantial piping and accessories. This conversion is both time consuming and expensive. While some improvements have been made to combine a filter and heat exchanger, such as in U.S. Pat. No. 5,456,244, there remains room for improvement in the art. For instance, there is a desire for a filter unit having a simplified construction that uses less material and achieves greater heat transfer rates than prior devices.

BRIEF DESCRIPTION OF THE INVENTION

The present invention provides filter units and methods for removing grease, oil and other particulates from air, for example, in a kitchen environment.

According to a first aspect of the invention, a filter unit includes a housing having an upstream side, a downstream side, and a cavity therebetween, a heat exchanger disposed within the cavity and comprising at least two tubes, at least one entrance aperture disposed on the upstream side of the housing and defined by at least one fin, at least one baffle disposed on the downstream side of the housing so as to be oppositely disposed from the at least one entrance aperture, and at least one exit aperture disposed on the downstream side of the housing adjacent the at least one baffle. The baffle and fin define at least one S-shaped flow path through the housing, and the flow path routes air around a downstream side of a first of the at least two tubes and then around an upstream side of a second of the at least two tubes. The S-shaped flow path promotes removal of grease and oil particulates from the air and inhibits the passage of a flame through the housing.

According to a second aspect of the invention, a filter unit includes a housing including a cavity, a heat exchanger disposed substantially within the cavity, at least one entrance aperture provided through the housing on an upstream side of the heat exchanger, at least one baffle provided on the housing on a downstream side of the heat exchanger, the downstream side being oppositely disposed of the upstream side, and at least one exit aperture provided through the housing on the downstream side of the heat exchanger. The baffle is aligned with the entrance aperture, such that when a gas is drawn through the entrance aperture and across the heat exchanger, the baffle redirects the gas towards the heat exchanger prior to the gas leaving the cavity through the exit aperture.

Other aspects of the invention include filtration systems and methods using filter units comprising the elements described above. For example, such a system may include a cooking surface that has a heat source and an exhaust system adapted to draw gasses rising from the cooking surface through a gas flow path that passes through a filter unit. The filter unit includes a housing having a cavity and a first heat exchanger disposed substantially within the cavity. The first heat exchanger includes a fluid input port and a fluid output port. The housing has at least one entrance aperture located on an upstream side of the first heat exchanger, and at least one baffle and at least one exit aperture located on a downstream side of the first heat exchanger that is oppositely disposed from the upstream side. The baffle is aligned with the entrance aperture, such that when the gasses are drawn through the entrance aperture and across the first heat exchanger, the baffle redirects the gasses towards the first heat exchanger prior to the gasses leaving the cavity through the exit aperture. The system further includes a fluid supply coupled to the input port and a drain line that couples the output port to a storage tank and/or a second heat exchanger.

Other aspects and advantages of this invention will be better appreciated from the following detailed description.

DETAILED DESCRIPTION OF THE INVENTION

Figure 1:
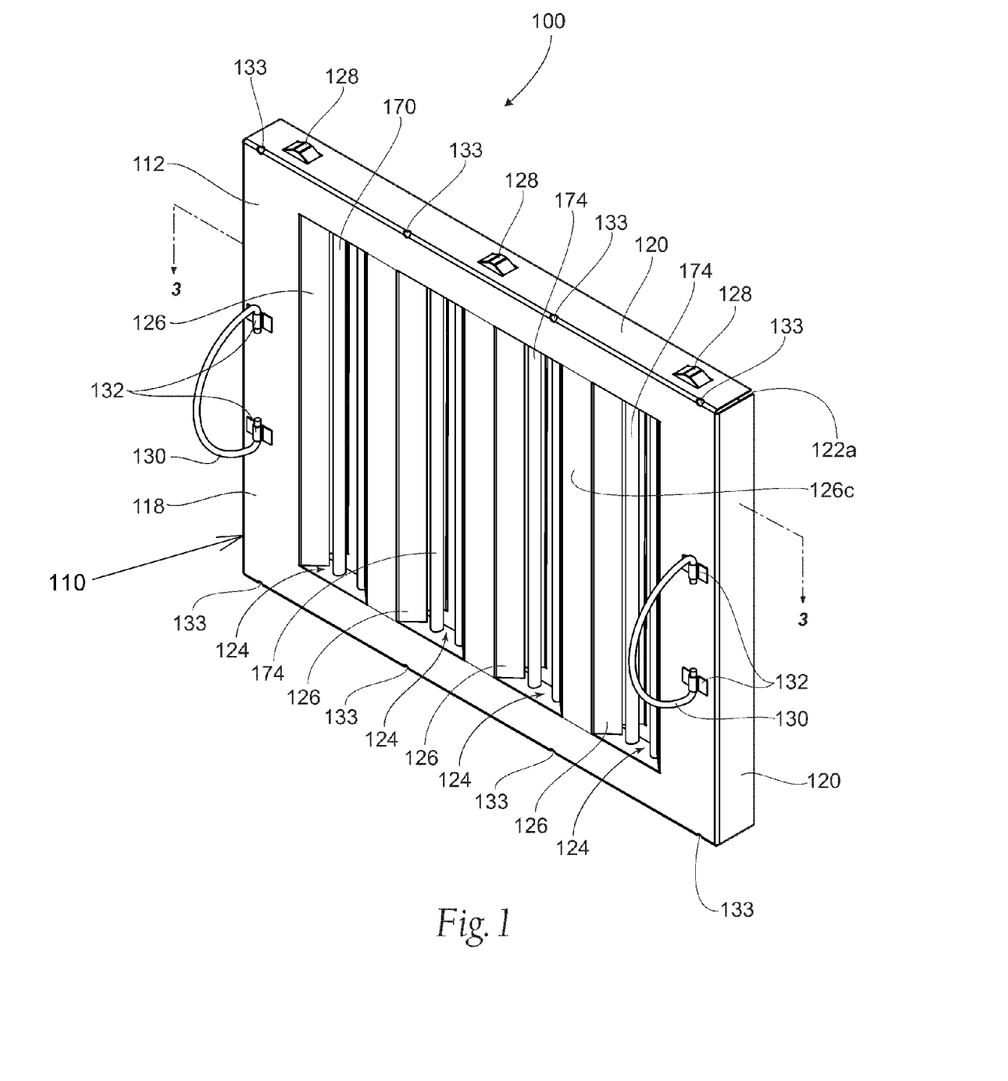
FIG. 1 is a perspective view of a filter unit in accordance with an embodiment of this invention.

FIG. 1 depicts a filter unit (cartridge) 100 and FIGS. 2 through 6 depict components of the unit 100 in accordance with an embodiment of the present invention. The filter unit 100 comprises a housing 110 and a heat exchanger 170. The heat exchanger 170 is preferably sized so as to be positioned substantially within a cavity 122 within the housing 110, and can be formed to be rotationally symmetrical in at least one plane such that it may be inserted into the cavity 122 in a plurality of orientations. As evident from FIG. 2, the housing 110 shown in FIG. 1 preferably comprises a base 112 and a cover 114. The base 112 may be formed in a configuration that is substantially a parallelepiped with an open top 116. If formed as such, the base 112 includes a base wall 118 and a plurality of lateral sidewalls 120. The base 112 may be formed from a cruciform shape that is stamped or otherwise formed out of a generally planar sheet material. Once stamped, the lateral sidewalls 120 may be bent towards each other, thus forming the cavity 122 of the housing 110. Alternatively, the sidewalls 120 may be coupled to the base wall 118, such as by welding. There may be a gap 122a between adjacent sidewalls 120 or the gap 122a may be closed with a sealant or welded. Additionally or alternatively, the plurality of sidewalls 120 may be formed as a unitary member, such as in a ring formation, and coupled to the base wall 118.

The base wall 118 is preferably perforate, including one or more air portals 124 formed therethrough, to allow air to pass into the housing cavity 122 through the base wall 118. Various shapes of the base wall 118 are contemplated, although a generally planar, rectilinear shape is preferred for ease of manufacture and installation. In addition, such shape is easily adaptable to be utilized with filter assembly units, or exhaust hoods, that are presently provided in commercial cooking settings. Furthermore, it is preferred that the shape of the filter unit 100 be at least laterally symmetrical, such that the unit 100 may be inserted into a given hood or exhaust assembly in a plurality of orientations, so as to provide ease of connectivity. In particular, the filter unit 100 is preferably rotationally symmetrical in at least one plane.

Figures 5, 6:
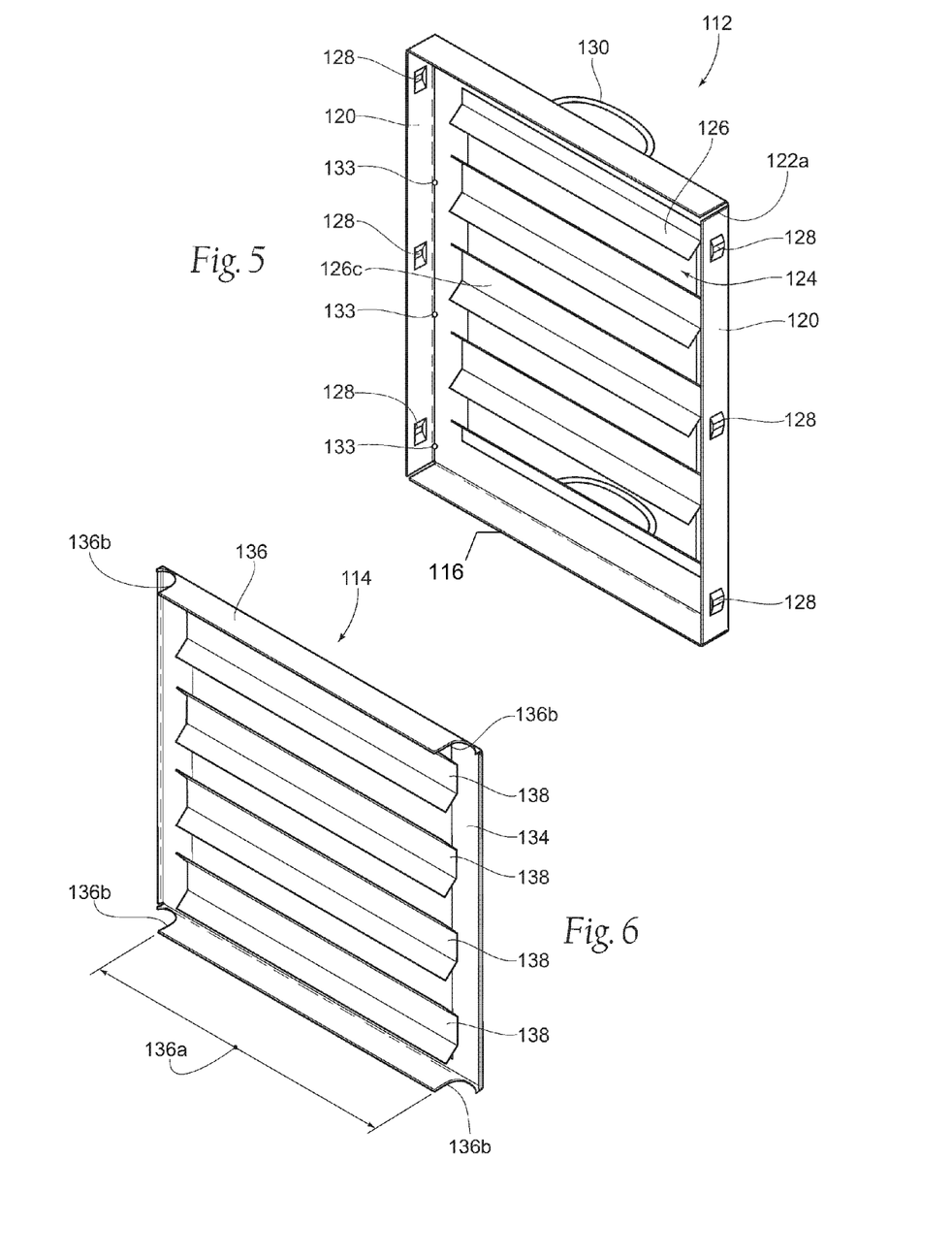
FIG. 5 represents a perspective view of the base of the housing shown in FIG. 2.
FIG. 6 represents a perspective view of the cover of the housing shown in FIG. 2.

The openings 124 formed in the base wall 118 of the base 112 preferably perform at least a slight nozzling function on air entering the housing 110. As represented in FIGS. 1 through 3 and 5, this can be accomplished by an arrangement of pairs of fins 126 adapted to extend from the openings 124 and towards each other. To help illustrate, two pairs of the fins 126 are labeled in FIG. 3 as fins 126a and 126b. As evident from FIG. 3, each opening 124 is preferably wider at its upstream side 124a and narrower at its downstream side 124b. The fins 126 may be formed from the same material as the base wall 118, and may be stamped and formed from the same piece of material as the base wall 118 and then bent into the housing cavity 122. In FIGS. 3 and 5, the fins 126 are represented as separate components that are preferably stationary coupled with respect to the base wall 118. In FIGS. 3 and 5, sets of fins 126 are coupled together with a fin plate 126c disposed between the two fins 126 to yield a unitary member. Each fin plate 126c may have a substantially planar surface that extends along its length, with end portions of the plate 126c secured to the base wall 118. The preferred nozzling function provided by the arranged fins 126 focuses the airflow towards baffles 138 (FIG. 2) that are included on the cover 114, or at least disposed on the opposite side of the heat exchanger 170 from the fins 126, to assist in the collection of grease particles. Also as later discussed, the direction of airflow creates a turbulent airflow to increase exposure time of the air with the heat exchanger 170. Accordingly, it is preferred that no direct airflow path is provided through the filter assembly 110, or at least a majority of the airflow therethrough is not direct. Rather, one or more tortuous flow paths 150 are created thereby allowing for a turbulent flow that exposes the heated air to the heat exchanger 170 for a sufficient amount of time to allow for adequate heat exchange to a fluid contained therein.

Also on the base 112, one or more retainer tabs 128 are preferably formed on at least one of the lateral side members 120, preferably on two opposing lateral side members 120. A preferred retainer tab 128 is a punched extrusion from the lateral side member 120 so as to form a spring type retention force. Also provided on the base 112 is at least one and preferably a plurality of handles 130, which may be formed in a variety of ways. Preferably, the handles 130 are provided in opposing positions on the assembly 100 to allow for balanced insertion and removal of the filter unit 100. The preferred handles 130 are full or partial wire loop handles that are suspended from handle brackets 132 that may be formed integrally with or coupled to the base wall 118.

In addition to acting as a heat exchanger, a filter unit 100 according to the present invention may serve as an air filter which assists in the collection of grease particles, which is especially advantageous for use above commercial cooking surfaces. To aid in the drainage of collected grease particles, the base 112 may be provided with one or more drain holes 133 formed therethrough. A plurality of drain holes 133 is preferred, and they may be formed along the juncture of one or more of the lateral side members 120 and the base wall 118.

Figure 2:
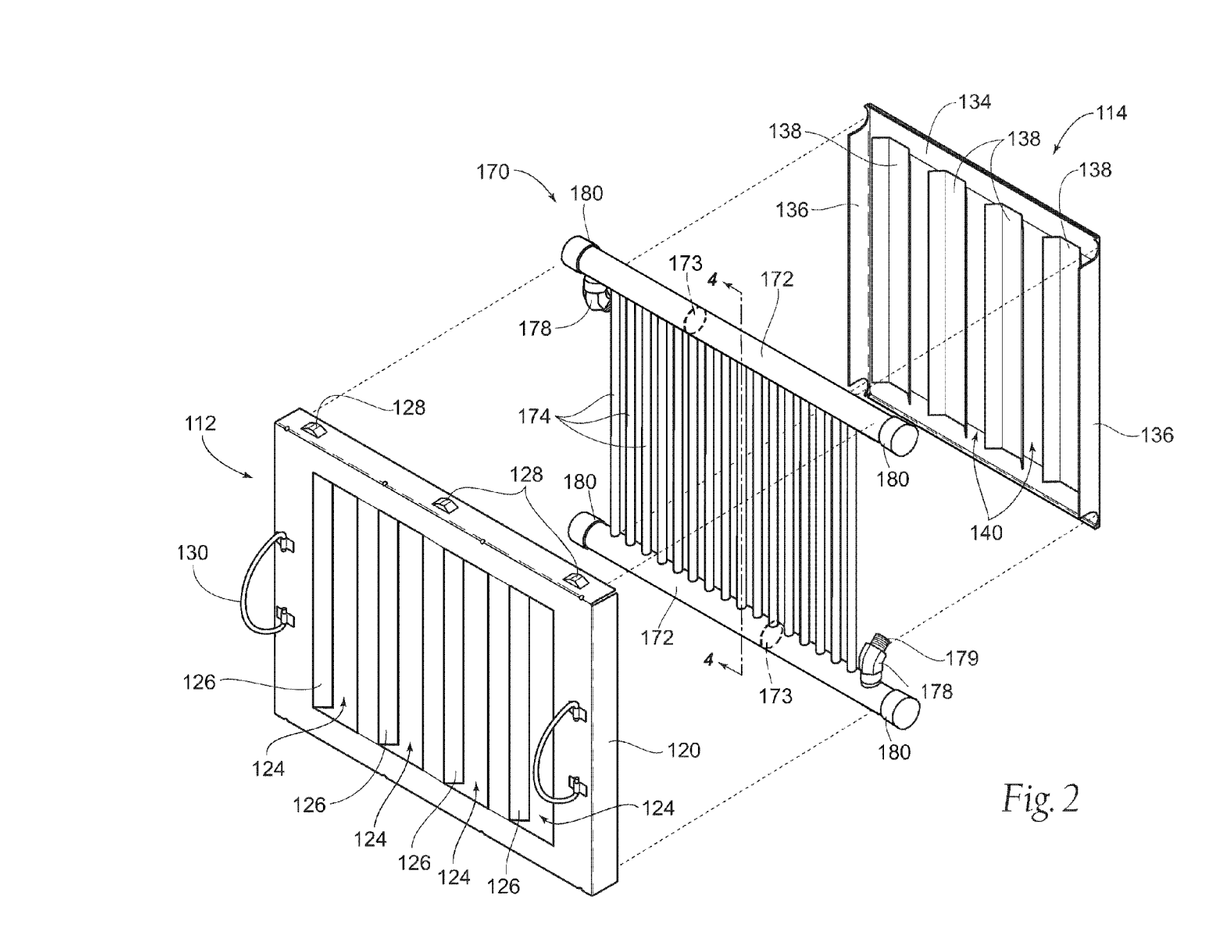
FIG. 2 represents an exploded view of the filter unit of FIG. 1, and shows a heat exchanger and a housing comprising a base and cover.
Figure 3:
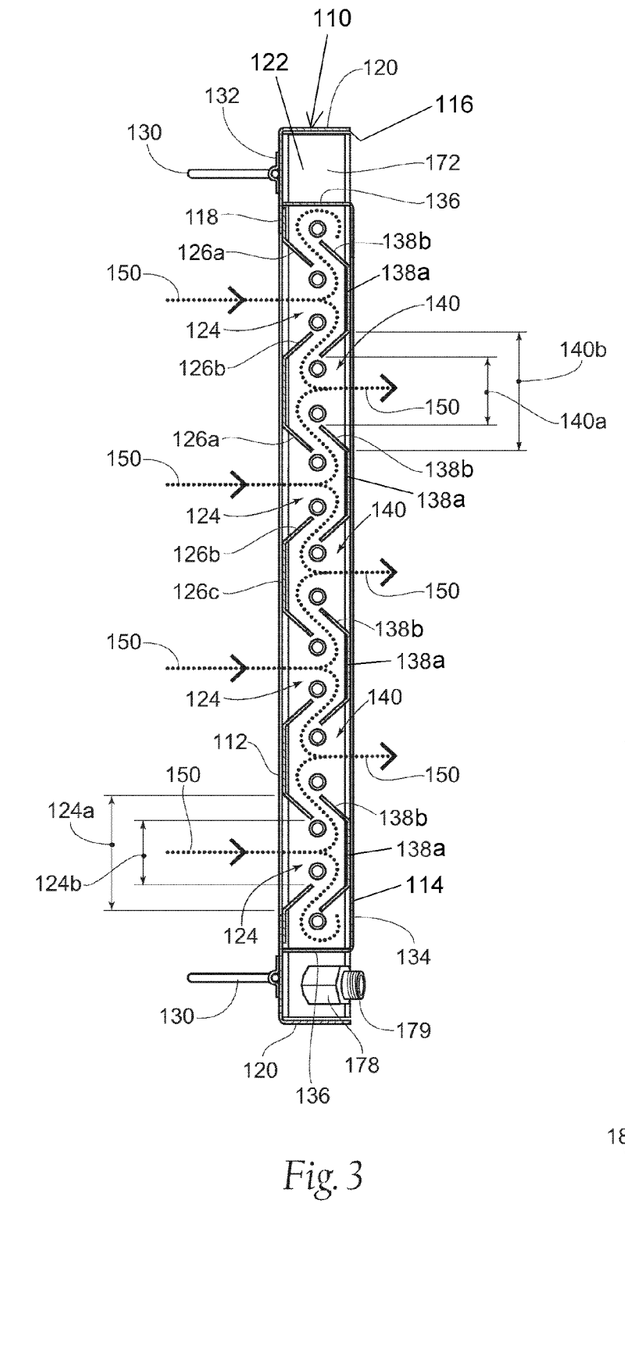
FIG. 3 represents a cross-sectional view of the filter unit taken along section line 3-3 of FIG. 1.

The cover 114 is represented in FIGS. 2, 3 and 6 as comprising a plate 134 and lateral side members 136 that extend from the plate 134. As indicated in FIG. 6, the side members 136 may be provided in a length 136a that allows insertion of the side members 136 between header pipes 172 of the heat exchanger 170. Furthermore, the side members 136 may be formed with one or more heat exchanger interfaces 136b, which may contact and/or surround a portion of the heat exchanger 170 to maintain position during and after installation. The cover 114 may be formed as a symmetrical shape that may be inserted into the base 112 in a plurality of orientations. Formed integrally with or coupled to the plate 134 are the previously noted baffles 138, which are disposed opposite the apertures 126 formed in the base 112 so as to assist in creating the tortuous flow paths 150 through the filter unit 100. The baffles 138 are preferably arranged to act as one or more diffusers, such that the upstream side 140a of openings 140 defined between the baffles 138 is smaller than the downstream side 140b. The baffles 138 may be formed to have a unitary construction similar or identical to that described for the fins 126 above. It is believed that the nozzle effect provided by the base 112 and the diffuser effect on the cover 114 is able to assist in the creation of the tortuous flow paths 150 to aid in the collection of grease and to maximize or assist in the heat transfer to fluid flowing through the heat exchanger 170, for example, a potable fluid such as water or propylene glycol.

The filter base 112 and cover 114 are preferably formed from a stainless steel, though other materials are foreseeable, for example, aluminum, copper and other steel alloys. A plastic housing could also be used, but is not generally preferred due to a desirability for durability in cleaning and repair. Further, plastic has demonstrated affections for grease, which may be caused by its insulative properties, and therefore it may require more frequent cleaning.

Figure 4:
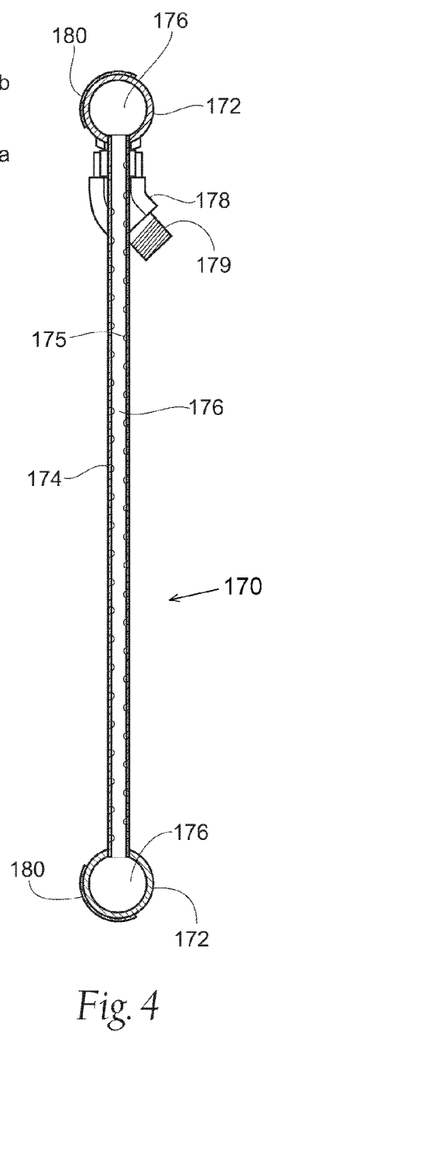
FIG. 4 represents a cross-sectional view of the heat exchanger taken along section line 4-4 of FIG. 2.

The heat exchanger 170 is represented in FIGS. 2 and 4 as comprising the aforementioned header pipes 172 and a plurality of fluid flow conduits 174 extending between the header pipes 172. Such arrangement provides a fluid flow chamber 176 within the header pipes 172 and conduits 174, through which a fluid flows. As represented in FIG. 2, though the conduits 174 have a parallel arrangement, dams 173 are preferably present within the header pipes 172 to create a serpentine flow path for the fluid flowing through the heat exchanger 170. However, it is also foreseeable that the dams 173 could be eliminated to result in a parallel flow configuration for the heat exchanger 170. In the embodiment of FIG. 2, each header 172 is provided with a fluid port 178 in fluid communication its fluid flow chamber 176. The ports 178 may be provided with threads 179 or other coupling mechanism, such as a standard fluid quick connect coupling, to be connected to a fluid supply or drain. Preferably, as shown, the ports 178 are provided on opposite ends of their respective header pipe 172. The opposite ends of the header pipes 172 are shown as being closed with caps 180, which can also serve as standoffs that cooperate with the base wall 118 of the base 112 to prevent rattling that might result from relative movement between the heat exchanger 170, base 112 and cover 114 during operation of the filter unit 100.

A preferred material for one or more, and preferably a majority, of the components of the heat exchanger 170 is copper, in which case a copper braze alloy can be used to join together the components of the heat exchanger 170. Exterior surfaces of the heat exchanger 170 are preferably coated with an adhesion-reducing material, such as a paint including polytetrafluoroethylene, available under the name TEFLON® from E.I. du Pont de Nemours and Company of Wilmington, Del. The non-stick material may be painted onto those components of the heat exchanger that would benefit from easier cleaning of grease, oil and other contaminants that collect on the heat exchanger 170 during the operation of the filter unit 100. Other materials for the heat exchanger 170 are foreseeable and within the scope of the invention.

In use, a filter unit 100 according to the present invention is inserted into a filter housing or holding unit above a cooking surface. As can be seen in the cross-section of FIG. 3, the combination of the fins 126 and baffles 138 create the tortuous (non-sightline) flow paths 150 for exhaust air to enter through the base wall 118 and exit through the cover plate 134. The flow paths 150 are directed around the fluid flow conduits 174 included in the heat exchanger 170. Accordingly, a majority of the conduits 174 are exposed directly to heated air flow, and not just a portion thereof. Such exposure combined with the turbulent nature of the airflow mechanism helps with the efficiency of the device. Additionally, the interiors of the conduits 174 can be formed to have a surface texture, for example, dimples 175 or other form of turbulators, to inhibit laminar flow through the conduits 174 and thereby promote heat transfer between the conduits 174 and the fluid flowing therethrough.

In FIG. 3, the tortuous flow path 150 through the cavity 122 of the housing 110 results in incoming air impinging the baffles 138. In particular, FIG. 3 shows the incoming air as impinging the surfaces 138a of the baffles 138 that are oriented transverse to the initial direction of airflow as it enters the housing 110. Each transverse surface 138a of each baffle 138 is located between a pair of converging walls 138b of the baffle 138 that define the openings 140 to either side of the baffle 138 and redirect the airflow toward the conduits 174 of the heat exchanger 170. The process of the air impacting the surfaces 138a of the baffles 138 initiates separation of entrained particulates from the incoming air. In a kitchen environment, such particulates are likely to include grease, oil and other matter that may be entrained in the incoming air. The particulates that collect on the baffles 138 coalesce and flow on the surfaces of the baffles 138 toward the end of the housing 110 where the drain holes 133 are located.

As also evident from FIG. 3, the airflow that is redirected toward the conduits 174 of the heat exchanger 170 impinge the interior surfaces of the fins 126, particularly the fin plates 126c of the fins 126. The process of the air impacting the surfaces of the fin plates 126c causes separation of additional particulates that may remain entrained from the air. As with the baffles 138, the particulates that collect on the fins 126 and their fin plates 126c coalesce and flow toward the end of the housing 110 where the drain holes 133 are located.

In combination, the baffles 138 and fins 126 cause the air flowing through the housing 110 to flow to the downstream side of each heat exchanger conduit 174, and then flow around the upstream side of an adjacent conduit 174 before being allowed to exit the housing 110 through one of the openings 140 between the baffles 138—effectively resulting in the flow paths 150 having an S-shape. As such, the majority of the air flows either around the downstream side of a conduit 174 or around the upstream side of a conduit 174, but generally not both. Notably, the conduits 174 are not equipped with fins of types commonly used and mounted directly to heat exchanger tubes, for example, fin plates through which the tubes pass or sinusoidal fins between tubes. While traditional fins would promote heat transfer from the air flow to the conduits 174, their absence greatly reduces the tendency for the heat exchanger 170 to become fouled by grease, oil and other contaminants borne in the air flow. The tortuous S-shaped flow paths 150 through the heat exchanger at least partially compensate for the absence of traditional fins.

In investigations leading to the invention, a grease extraction capability of about 14:1 was achieved with an S-shaped flow path 150 essentially as represented in FIG. 3. In addition to promoting the thermal efficiency of the heat exchanger 170 and the removal of particulates from the air, this flow path 150 also serves as a flame barrier through the housing 110 and, therefore, through the filter unit 100. In particular, investigations leading to the present invention showed that the S-shaped flow path 150 through the housing 110 enabled the filter unit 100 to pass the applicable standards of Underwriter Laboratories, Inc., for inflammability.

Figure 7A:
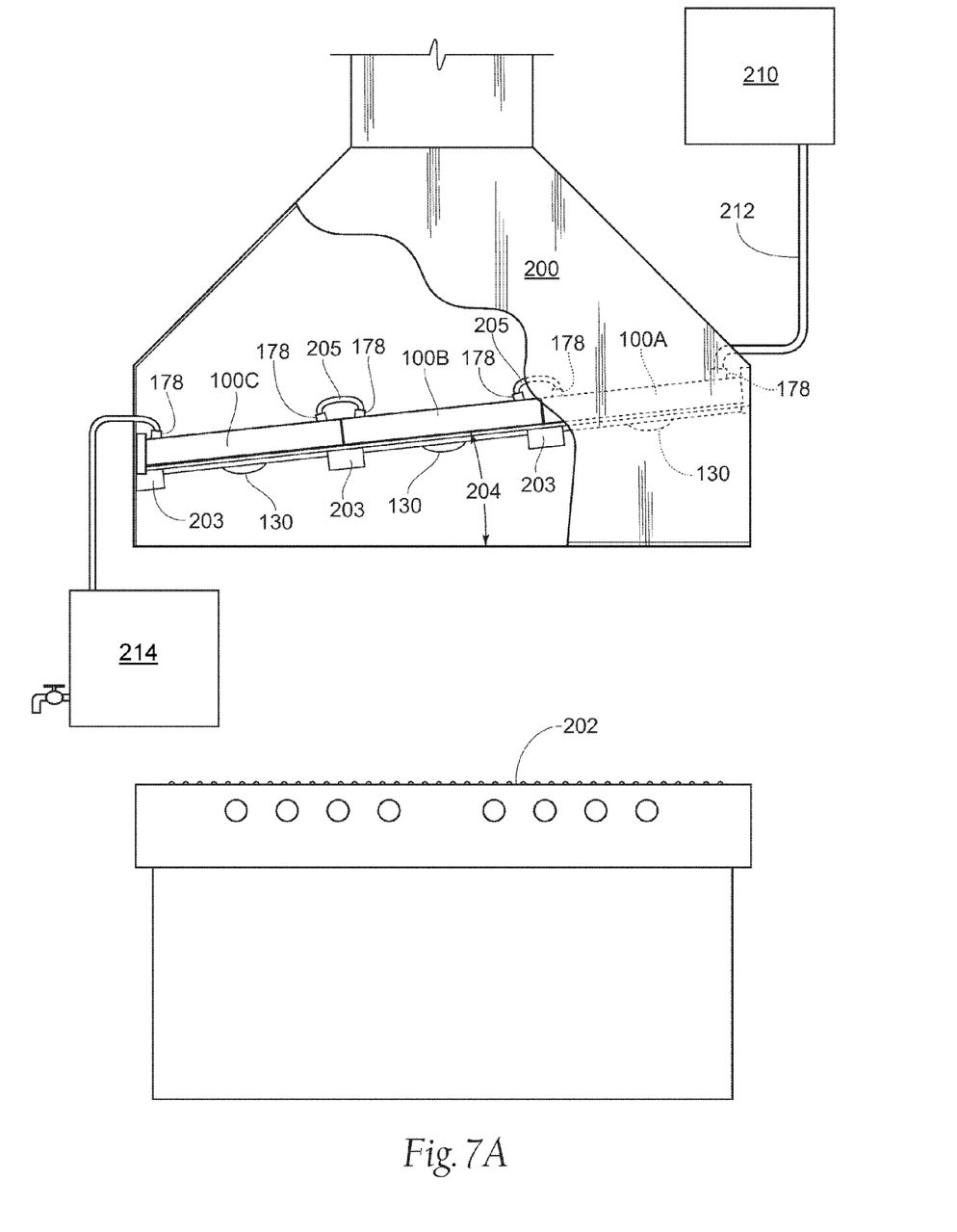
FIG. 7A schematically represents an installation for the filter unit of FIG. 1 in accordance with an embodiment of this invention.

Generally, systems and methods according to the present invention may be used to collect heat generated by a cooking surface, which would otherwise be wasted as exhaust, and transfer such heat to other locations for use in an open or closed circulation system. As can be seen in FIG. 7A, one or more filter units 100 may be installed in an exhaust housing 200, preferably above a cooking surface 202. While the filter 100 could be installed at any desirable angle, such as parallel to horizontal level, it is preferably installed at an angle 204 relative to horizontal level, for example, about 12 degrees to about 45 degrees for most efficient drainage of collected oil particles, thus disposing the longitudinal dimension of the fins 124 and baffles 138 at approximately such angle. Collected oil preferably drains through the drain holes 133 and into one or more grease traps 203. As further shown in FIG. 7A, a plurality of filter units 100 may be coupled together to form an expanded filter unit system. The units 100 may be coupled in series, as shown, or in parallel. If coupled in series, the first filter unit 100A in the series can be coupled to a fluid supply line 212, a coupler 205 can be used to connect the drain port 178 of the filter unit 100A to the supply port 178 of a subsequent filter unit 100B, and so on, with the final filter unit 100C in the series being coupled to a storage tank 214. If coupled in parallel, the supply port 178 of each unit 100A-C would be coupled to the fluid supply line 212 and the drain port 178 of each unit 100A-C would be coupled to the storage tank 214.

A system utilizing the filter unit(s) 100 of the present invention may be an open system, such as when the heated fluid is removed from the system and put to some other use, such as dishwashing, or stored for future use. FIG. 7A depicts an open system. Water or other desirable fluid may be provided by gravity pressure, such as from an elevated supply tank 210 or municipal water supply, or it may be pumped to the system. The fluid supply line 212 and standard connections can be used to couple the first filter unit 100A to the supply tank 210. The fluid flows through the one or more filter units 100, and then drains into the storage tank 214 for future use, such as being pumped to a dishwasher, hot water supply in a restroom, or used for other purposes.

Figure 7B:
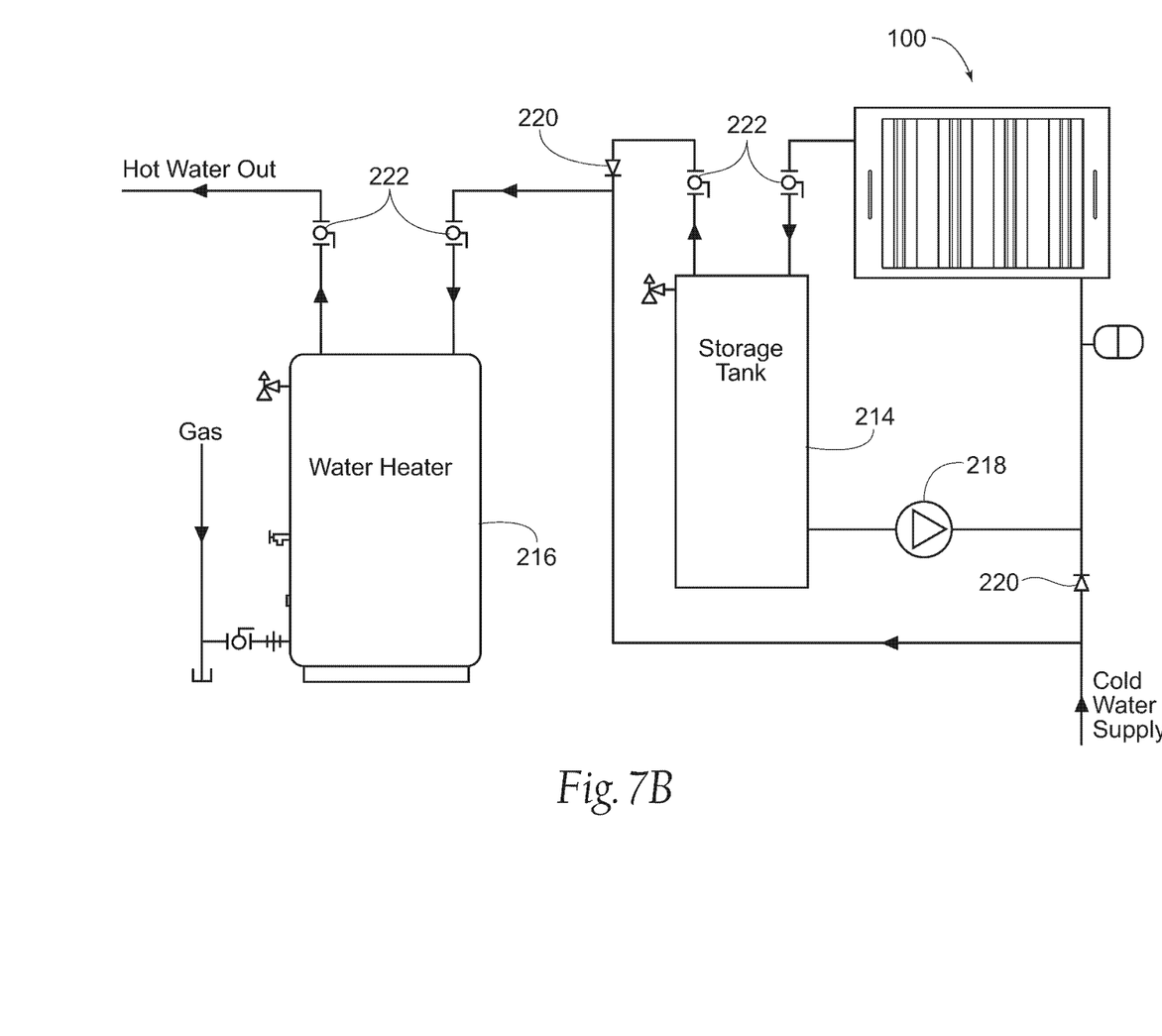
FIG. 7B is a schematic of a plumbing system containing the filter unit of FIG. 1 in accordance with another embodiment of this invention.

Another embodiment of an open system is represented in FIG. 7B. In addition to the storage tank 214, the enhanced system includes a water heating tank 216 and a recirculating pump 218. The plumbing diagram of FIG. 7B will be readily understood by a person having ordinary skill in the art as including various check valves 220 and shut-off valves 222 in desired positions. One advantage to the system of FIG. 7B is that if fluid usage does not keep up with the supply of heated fluid, fluid stored in the storage tank 214 may be recirculated to keep it warm in the event of demand increase. The recirculating pump 218 may be selectively activated and deactivated, such as on a timed schedule or based upon a measured temperature of the fluid in the storage tank 214 falling below a predetermined threshold.

Figure 8:
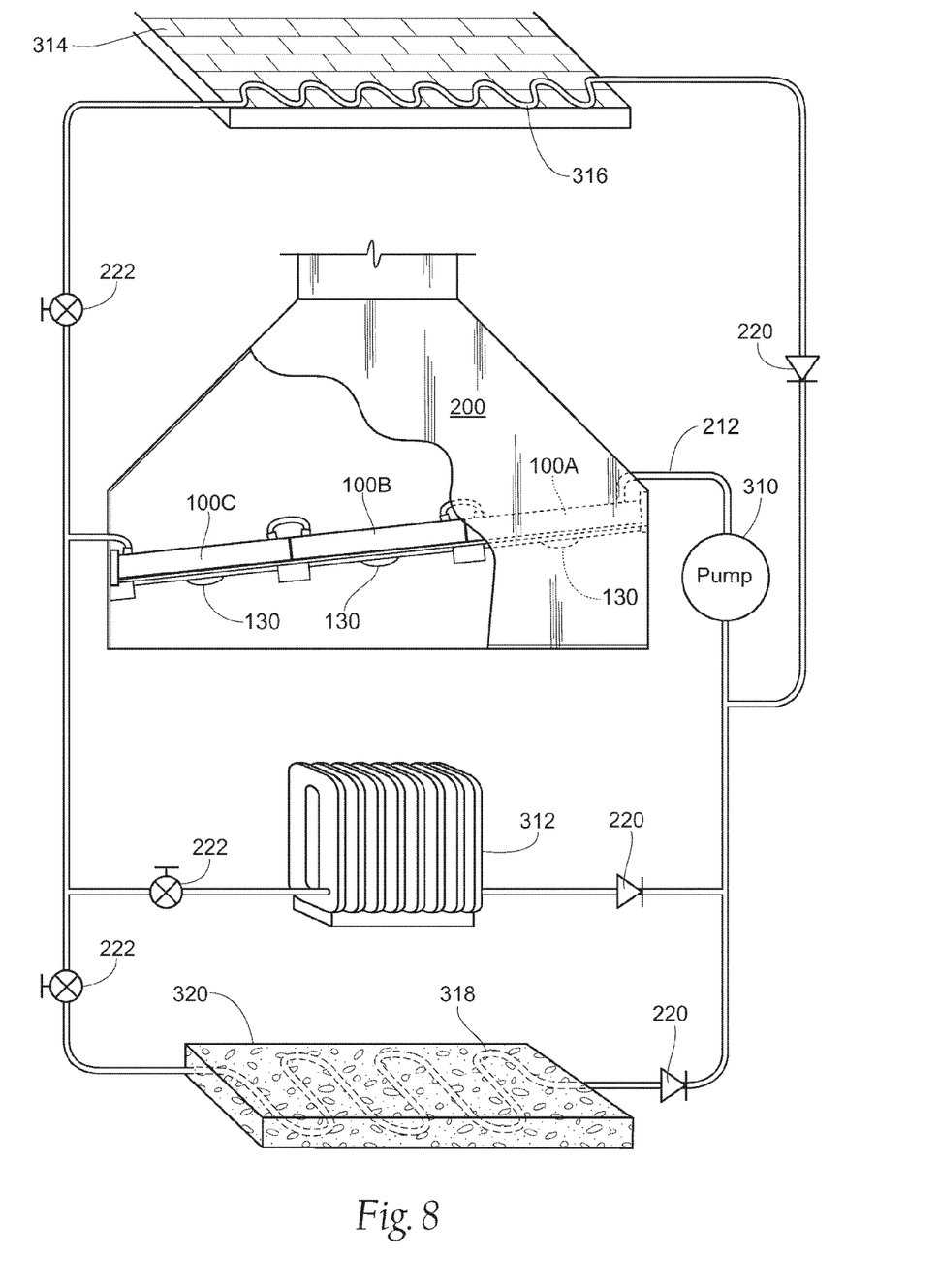
FIG. 8 schematically represents an installation for the filter unit of FIG. 1 in accordance with yet another embodiment of this invention.

Additionally or alternatively, the system may be a closed system, where the goal may be to transfer the heat from the exhaust gases to a desired use elsewhere. An example of a closed system is shown in FIG. 8. In this system, water or other fluid is introduced into the closed system and substantially all of any residual air is purged. The fluid is represented as being pumped through the system by an inline pump 310, through the fluid supply line 212 and through one or more filter units 100. After traveling through the one or more filter units 100, in which the fluid was heated by exhaust from the cooking surface 202, the fluid may then be caused to travel through one or more additional heat exchangers. For instance, the fluid may be pumped through a radiator 312 to heat a room. Additionally or alternatively, the fluid may be pumped through a roof heat exchanger 314 disposed along the edge of the roof 316 of the building in which the system is housed to prevent ice damming along the roof edge. Additionally or alternatively, the fluid may be pumped through a sidewalk heat exchanger 318 disposed beneath or embedded in a concrete or other external walkway 320 to reduce the buildup of ice thereon. It is to be appreciated that the function of a system according to the present invention may be changed depending upon the time of year. For instance, in summer months, it may not be desirable to use a closed system for heating purposes as described. In such situations, the fluid may remain static and the filter units 100 may simply be used to collect oil particulates from the exhaust air. Alternatively, the closed system could be changed to an open system in the summer months, thereby providing hot water for use.

While the invention has been described in terms of a specific embodiment, it is apparent that other forms could be adopted by one skilled in the art. For example, the physical configuration of the filter unit 100 could differ from that shown, and materials and processes other than those noted could be used. Therefore, the scope of the invention is to be limited only by the following claims.

The invention claimed is:

1. A filter unit comprising:
  a housing having an upstream side, a downstream side, and a cavity therebetween;
  a heat exchanger disposed within the cavity, the heat exchanger comprising at least two parallel tubes;
  at least a first entrance aperture disposed on the upstream side of the housing and defined by at least a first fin;
  at least a first baffle disposed on the downstream side of the housing so as to be oppositely disposed from the first entrance aperture; and
  at least a first exit aperture disposed on the downstream side of the housing adjacent the first baffle;
  wherein the first baffle and the first fin define at least one S-shaped flow path through the housing between the first entrance aperture and the first exit aperture, and the flow path routes a majority of air that enters the upstream side of the housing through the first entrance aperture around a downstream side of a first of the at least two parallel tubes, then between the first baffle and the first fin, and then around an upstream side of a second of the at least two parallel tubes, wherein the S-shaped flow path promotes removal of grease and oil particulates from the air and inhibits the passage of a flame through the housing;
  wherein the housing comprises a base and a cover that define the cavity, the base comprises a substantially planar base wall having a base wall perimeter and a plurality of lateral sidewalls coupled to the base wall perimeter and surrounding the cavity, the first entrance aperture is through the base wall, and the base further comprises the first fin and a second fin each extending partially across the at least one entrance aperture into the cavity at an oblique angle relative to the base wall.

2. The filter unit according to claim 1, wherein the cover comprises:
  a substantially planar cover plate having a cover plate perimeter; and
  at least one lateral cover sidewall coupled to and extending at an oblique angle from the cover plate, the at least one lateral cover sidewall adapted to extend into the cavity;
  wherein the first exit aperture is through the cover plate.

3. The filter unit according to claim 1, wherein the heat exchanger comprises:
a first header pipe having oppositely-disposed first and second ends;
a second header pipe spaced from the first header pipe and having oppositely-disposed first and second ends;
at least one fluid flow conduit disposed between and in fluid communication with the first header pipe and the second header pipe, wherein the header pipes and the at least one fluid flow conduit define a fluid cavity;
a first fluid port provided on the first header pipe in fluid communication with the fluid cavity; and
a second fluid port provided on the second header pipe in fluid communication with the fluid cavity.

4. The filter unit according to claim 1, wherein the heat exchanger comprises a heat-conductive material and an exterior thereof is at least partially coated with an adhesion-reducing material.

5. The filter unit according to claim 1, wherein the heat exchanger does not have any fins attached directly to the at least two parallel tubes.

6. A method of filtering air using the filter unit according to claim 1, the method comprising drawing air through the housing and collecting grease and oil particulates on the first baffle and on the first fin.

7. A system comprising:
a cooking surface including a heat source;
an exhaust system adapted to draw in gasses that are disposed above the cooking surface, the exhaust system providing a gas flow path for the gasses;
at least one of the filter unit of claim 1 disposed in the gas flow path; and
a fluid supply and a drain line coupled to at least one heat exchanger of the at least one filter unit.

8. A system comprising:
a cooking surface including a heat source;
an exhaust system adapted to draw in gasses that are disposed above the cooking surface, the exhaust system providing a gas flow path for the gasses;
a filter unit disposed in the gas flow path, the filter unit comprising:
a housing including a cavity;
a first heat exchanger disposed substantially within the cavity, the first heat exchanger including a fluid input port and a fluid output port;
at least a first entrance aperture provided through the housing on an upstream side of the first heat exchanger;
at least a first baffle provided on the housing on a downstream side of the first heat exchanger, the downstream side being oppositely disposed of the upstream side; and
at least a first exit aperture provided through the housing on the downstream side of the first heat exchanger,
wherein the first baffle is aligned with the first entrance aperture, such that when the gasses are drawn through the first entrance aperture and across the first heat exchanger, the first baffle redirects the gasses towards the first heat exchanger prior to the gasses leaving the cavity through the first exit aperture;
a fluid supply coupled to the input port; and
a drain line coupled at a drain upstream end to the output port and at a drain downstream end to one or more of a storage tank and a second heat exchanger.

9. The system according to claim 8, wherein the second heat exchanger is selected from the group consisting of: a radiator adapted to heat an indoor space; a length of heat-conductive tubing disposed in or below a walking surface; and a length of heat-conductive tubing disposed on a roof of a building.

10. The system according to claim 8, wherein the drain line is coupled to the second heat exchanger and a third heat exchanger.

11. The system according to claim 10, wherein each of the second heat exchanger and the third heat exchanger is selected from the group consisting of: a radiator adapted to heat an indoor space; a length of heat-conductive tubing disposed in or below a walking surface; and a length of heat-conductive tubing disposed on a roof of a building.

12. The system according to claim 8, wherein the cooking surface is disposed substantially parallel to horizontal level, the filter unit further comprising a substantially planar base wall arranged at an oblique angle relative to the cooking surface.

13. A method of filtering air using a filter unit, the method comprising:
drawing air through at least a first entrance aperture disposed in an upstream side of a housing of the filter unit, then through a cavity within the housing and around at least two parallel tubes of a heat exchanger of the filter unit within the cavity, and then through at least a first exit aperture disposed in a downstream side of the housing; and
collecting grease and oil particulates on at least a first baffle and on at least a first fin of the housing;
wherein the first entrance aperture is defined by at least the first fin and the first exit aperture is adjacent at least the first baffle oppositely disposed from the first entrance aperture, the first baffle and the first fin define at least a first flow path through the housing, and the drawing step causes a majority of air to be routed around a downstream side of a first of the at least two parallel tubes and then around an upstream side of a second of the at least two parallel tubes to promote removal of grease and oil particulates from the air and inhibit the passage of a flame through the housing;
wherein the housing comprises a base and a cover that define the cavity, the base comprises a substantially planar base wall having a base wall perimeter and a plurality of lateral sidewalls coupled to the base wall perimeter and surrounding the cavity, the first entrance aperture is through the base wall, and the base further comprises the first fin and a second fin each extending partially across the at least one entrance aperture into the cavity at an oblique angle relative to the base wall.

14. The method according to claim 13, wherein the method is performed in a system comprising a heated cooking surface and an exhaust system drawing gasses through the filter unit rising from the heated cooking surface.

15. The method according to claim 13, wherein the first flow path is an S-shaped flow path.